(12) United States Patent
Zhou et al.

(10) Patent No.: US 7,126,577 B2
(45) Date of Patent: Oct. 24, 2006

(54) ELECTROPHORETIC ACTIVE MATRIX DISPLAY DEVICE

(75) Inventors: Guo-Fu Zhou, Eindhoven (NL); Mark Thomas Johnson, Eindhoven (NL); Alexander Victor Henzen, Heerlen (NL); Willibrordus Jurrianus Dijkman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 212 days.

(21) Appl. No.: 10/507,812

(22) PCT Filed: Feb. 6, 2003

(86) PCT No.: PCT/IB03/00423

§ 371 (c)(1),
(2), (4) Date: Sep. 14, 2004

(87) PCT Pub. No.: WO03/079323

PCT Pub. Date: Sep. 25, 2003

(65) Prior Publication Data

US 2005/0162377 A1    Jul. 28, 2005

(30) Foreign Application Priority Data

Mar. 15, 2002 (EP) .................... 02076038
May 24, 2002 (EP) .................... 02077017

(51) Int. Cl.
*G09G 3/34* (2006.01)
(52) U.S. Cl. ...................................... 345/107
(58) Field of Classification Search ............... 345/107; 359/296
See application file for complete search history.

(56) References Cited

U.S. PATENT DOCUMENTS 6,762,744 B1 * 7/2004 Katase ..................... 345/107
6,961,047 B1 * 11/2005 Katase ..................... 345/107

* cited by examiner

*Primary Examiner*—Sumati Lefkowitz
*Assistant Examiner*—Rodney Amadiz

(57) ABSTRACT

The invention relates to a display device comprising electrophoretic particles, a display element comprising a pixel electrode and an associated counter electrode, between which a portion of the electrophoretic particles is present, and a controller for supplying a drive signal to the electrodes to bring the display element to a predetermined black or white state, corresponding to the image information to be displayed. In order to improve the refresh time of the display, the controller is further arranged to supply a preset signal preceding the drive signal comprising a preset pulse representing an energy which is sufficient to release the electrophoretic particles at a first position near one of the two electrodes corresponding to a black state, but is too low to enable the particles to reach a second position near the other electrode corresponding to a white state.

17 Claims, 6 Drawing Sheets

ELECTROPHORETIC ACTIVE MATRIX DISPLAY DEVICE

The invention relates to a display device as defined in the pre-characterizing part of claim 1.

Display devices of this type are used in, for example, monitors, laptop computers, personal digital assistants (PDAs), mobile telephones and electronic books.

A display device of the type mentioned in the opening paragraph is known from international patent application WO 99/53373. This patent application discloses an electronic ink display comprising two substrates, one of which is transparent and the other substrate is provided with electrodes arranged in rows and columns. A crossing between a row and a column electrode is associated with a display element. The display element is coupled to the column electrode via a thin-film transistor (TFT), the gate of which is coupled to the row electrode. This arrangement of display elements, TFT transistors and row and column electrodes jointly forms an active matrix. Furthermore, the display element comprises a pixel electrode. A row driver selects a row of display elements and the column driver supplies a data signal to the selected row of display elements via the column electrodes and the TFT transistors. The data signal corresponds to graphic data to be displayed.

Furthermore, an electronic ink is provided between the pixel electrode and a common electrode provided on the transparent substrate. The electronic ink comprises multiple microcapsules of about 10 to 50 microns. Each microcapsule comprises positively charged white particles and negatively charged black particles suspended in a fluid. When a negative field is applied to the common electrode, the white particles move to the side of the microcapsule directed to the transparent substrate, and the display element becomes visible to a viewer. Simultaneously, the black particles move to the pixel electrode at the opposite side of the microcapsule where they are hidden from the viewer. By applying a positive field to the common electrode, the black particles move to the common electrode at the side of the microcapsule directed to the transparent substrate, and the display element appears dark to a viewer. When the electric field is removed, the display device remains in the acquired state and exhibits a bi-stable character.

Grey scales can be created in the display device by controlling the amount of particles that move to the counter electrode at the top of the microcapsules. For example, the energy of the positive or negative electric field, defined as the product of field strength and time of application, controls the amount of particles moving to the top of the microcapsules.

The known display devices have a so-called dwell time. The dwell time is defined as the interval between a previous image update and a new image update.

A disadvantage of the present display is that it exhibits an underdrive effect, which leads to inaccurate grey scale reproduction. This underdrive effect occurs, for example, when an initial state of the display device is black and the display is periodically switched between the white and the black state. For example, after a dwell time of several seconds, the display device is switched to white by applying a negative field for an interval of 200 ms. In a subsequent interval, no electric field is applied for 200 ms and the display remains white, and in the next interval a positive field is applied for 200 ms and the display is switched to black. The brightness of the display as a response of the first pulse of the series is below the desired maximum brightness, which can be reproduced several pulses later.

It is an object of the invention to provide a display device of the type mentioned in the opening paragraph which has an improved reproduction of grey scales.

To achieve this object, a first aspect of the invention provides a display device as defined in claim 1.

The invention is based on the recognition that the optical response depends on the history of the display element. The inventors have observed that when a preset signal is supplied before the drive signal to the pixel electrode, which preset signal comprises a pulse representing an energy which is sufficient to release the electrophoretic particle from a static state at one of the two electrodes, but is too low to reach the other one of the electrodes, the underdrive effect is reduced. Because of the reduced underdrive effect, the optical response to an identical data signal will be substantially equal, regardless of the history of the display device and in particular its dwell time. The underlying mechanism can be explained by the fact that, after the display device is switched to a predetermined state, e.g. a black state, the electrophoretic particles come to a static state, when a subsequent switching to the white state takes place, in which the momentum of the particles is low because their starting speed is close to zero. This results in a long switching time. The application of the preset pulses increases the momentum of the electrophoretic particles and thus reduces the switching time.

A further advantage is that the application of the preset pulses significantly reduces a prior history of the electronic ink, whereas, in contrast, conventional electronic ink display devices require massive signal processing circuits for generating data pulses of a new frame, storage of several previous frames and a large look-up table.

Such a preset pulse may have a duration of one order of magnitude less than the time interval between two subsequent image updates. An image update takes place when the image information of the display device is renewed or refreshed.

Further advantageous embodiments of the invention are defined in the dependent claims.

In an embodiment as defined in claim 3, the power dissipation of the display device can be minimised by applying just a single preset pulse.

In an embodiment as defined in claim 4, a preset signal consisting of an even number of preset pulses of opposite polarity can be generated for minimising the DC component and the visibility of the preset pulses of the display device. Two preset pulses, one with a positive polarity and one with a negative polarity will minimize the power dissipation of the display device in this mode of operation.

In an embodiment as defined in claim 5, the electrodes are arranged to form a passive matrix display.

In an embodiment as defined in claim 6, the display device is provided with an active matrix addressing to provide the data signals to the pixel electrodes of the display elements.

In an embodiment as defined in claim 7, the display elements are interconnected in two or more groups, wherein preset pulses having a different polarity are supplied to the different parts of the screen. For example, when in a single frame addressing period the preset pulses are applied with a positive polarity to all even rows and with a negative polarity to all odd rows, adjacent rows of the display device will appear alternately brighter and darker, and in the subsequent frame addressing period the positive and negative polarities of the preset pulses are inverted, in which the perceptual appearance will then hardly be affected, as the eye integrates these short brightness fluctuations both across the display (spatial integration) and on subsequent frames (temporal averaging). This principle is similar to the line inversion principle in methods of driving liquid crystal displays with reduced flicker.

In an embodiment as defined in claim 8, the preset signals are generated in the second driving means and applied to the pixel electrodes simultaneously by selecting, for example, all even rows followed by all odd rows at a time by the first driving means. This embodiment requires no additional electronics on the substrates.

In an embodiment as defined in claim 9, the preset signals are applied directly via the counter electrode to the pixel electrode. An advantage of this arrangement is that the power consumption is lower because the capacitance involved in this case is lower than in a case where the row or column electrodes are addressed.

In an embodiment as defined in claim 10, the counter electrode is divided into several portions, in order to reduce the visibility of the preset pulses.

In an embodiment as defined in claim 11, the pixel electrode is coupled via a first additional capacitive element. The voltage pulses on the pixel electrode can now be defined as the ratio of a pixel capacitance and the first additional capacitive element. The pixel capacitance is the intrinsic capacitance of the material between the pixel electrode and the transparent substrate. Particularly in combination with an encapsulated electrophoretic material as supplied by E-Ink Corporation, this embodiment may be advantageous because, in case the first additional capacitive element is selected to have a large value compared to the pixel capacitance, the preset signal will substantially be transmitted to the pixel electrode, which reduces the power consumption.

Furthermore, the pixel capacitance will not vary significantly with the different applied grey levels. Thus, the preset pulse on the pixel electrode will be substantially equal for all display elements, irrespective of the applied grey levels.

In an embodiment as defined in claim 12, the pixel element is coupled to the control means via a further switching element. The further switching elements allow a division of the display elements into two or more groups.

In an embodiment as defined in claim 15, the grey scale reproduction of the display device can be further improved. Storing previous states and the current state of the display element and determining the drive signal in dependence upon the stored previous states, the current state and the new state of the display element improves the grey scale reproduction. In order to determine the drive signal, the processing means can be provided with a look-up table whose entries correspond to the previous state and the new state of the display elements.

In an embodiment as defined in claim 17, the grey scale reproduction can be further improved by incorporating a temperature sensor and a temperature compensation to correct the drive signal for the actual operating temperature of the display device.

These and other aspects of the invention are apparent from and will be elucidated with reference to the embodiments described hereinafter.

Figure 7:
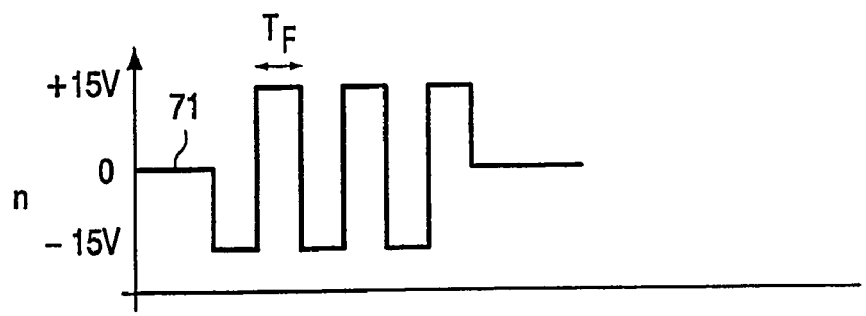
Figure 7:
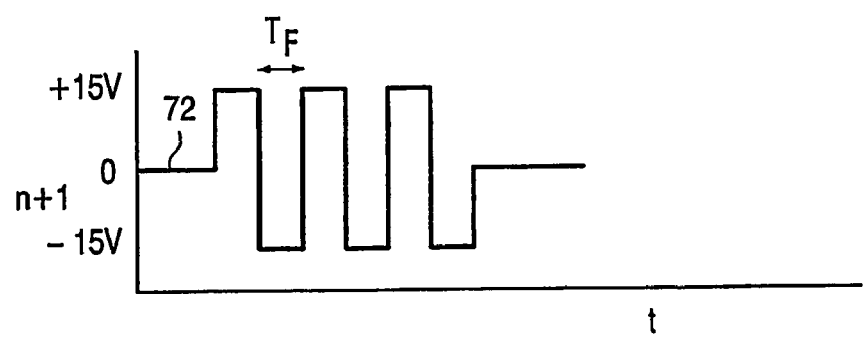
Figure 8:
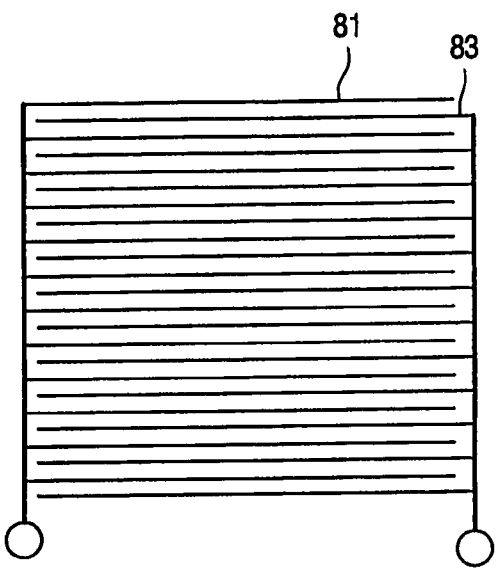
Figure 9:
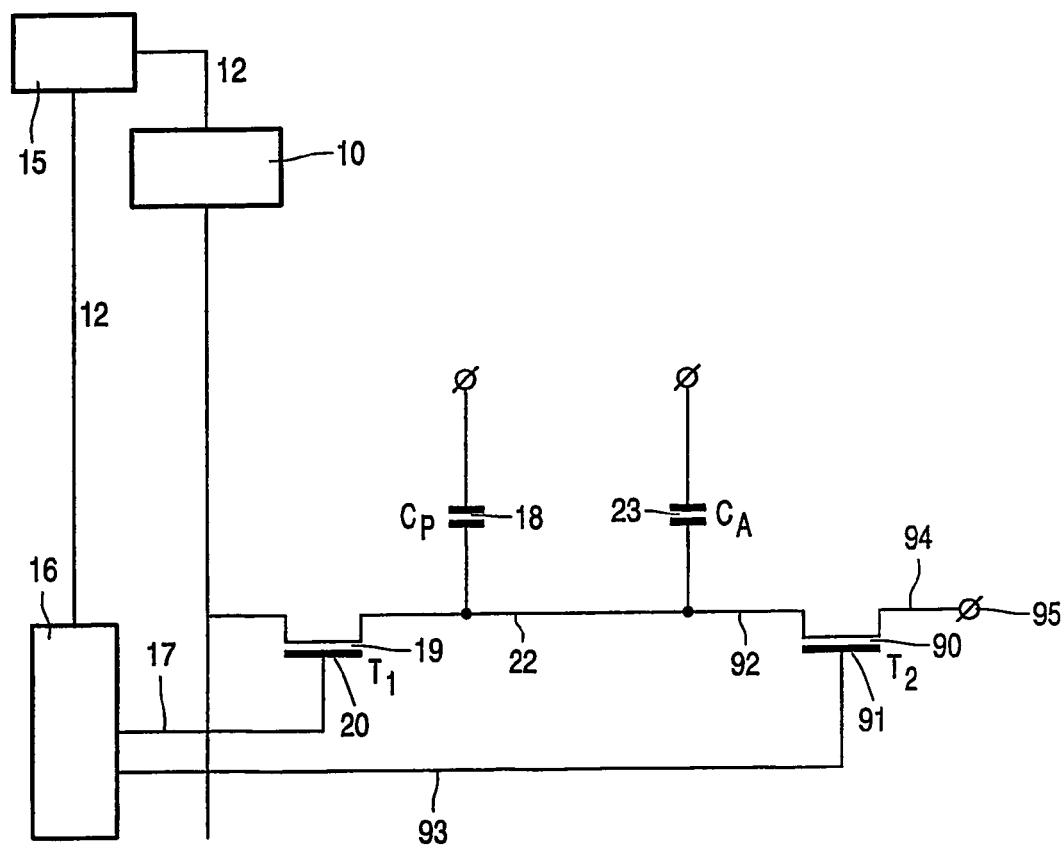
Figure 10:
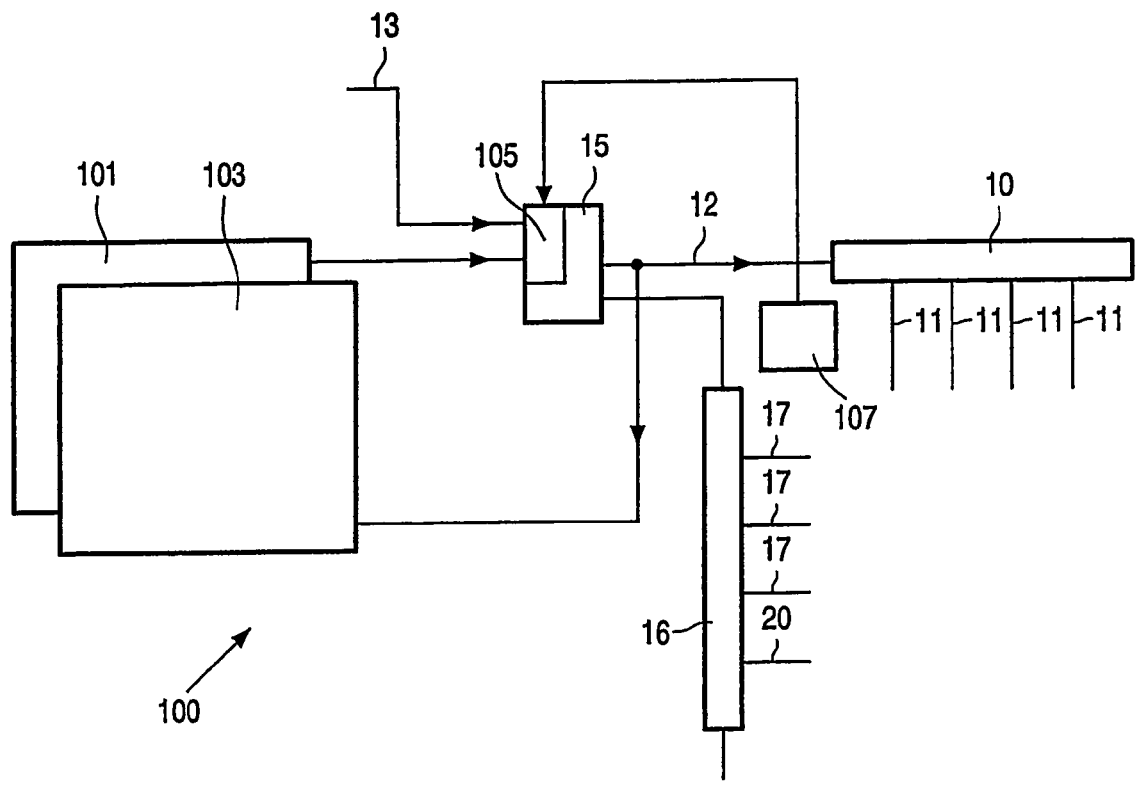
Figure 11:
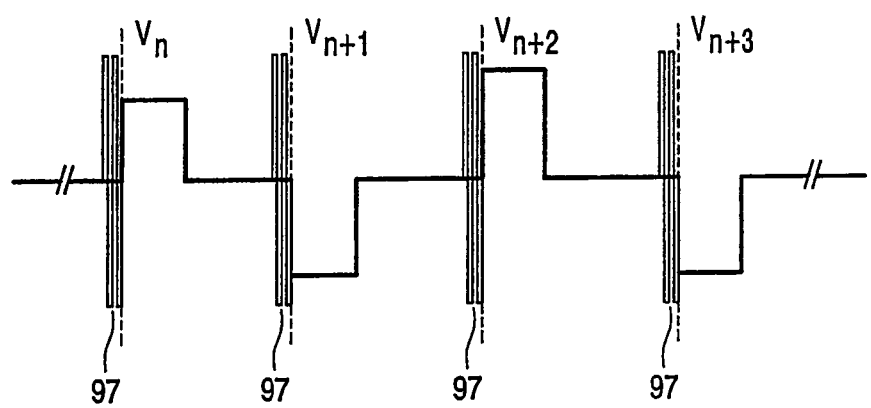
Figure 12:
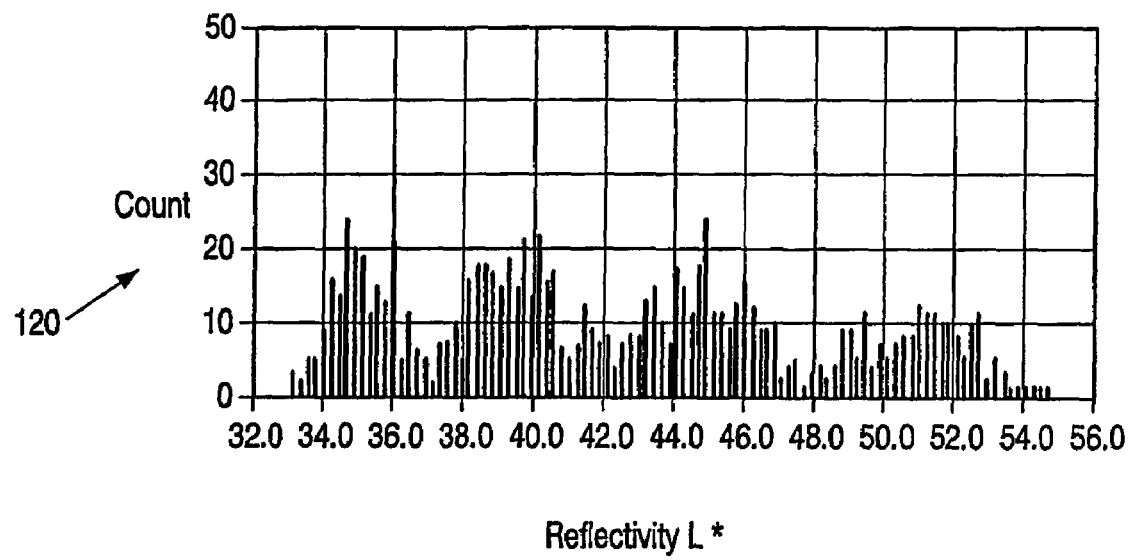
Figure 13:
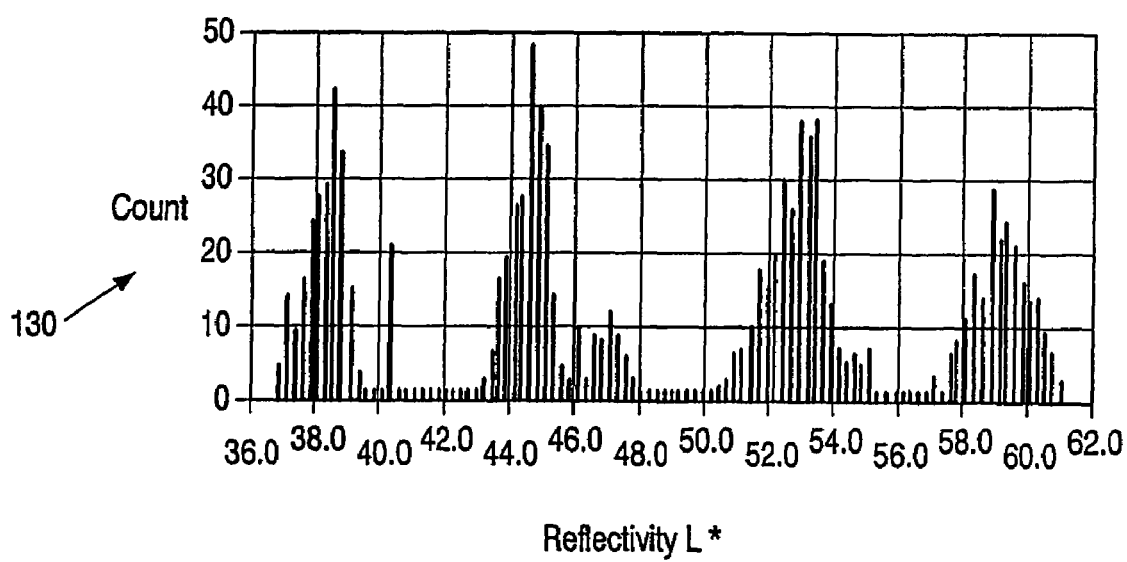

FIG. 7 shows preset signals for pixel electrodes for two adjacent rows consisting of 6 pulses of opposite polarities, FIG. 8 shows an example of a counter electrode comprising interdigitized comb structures, FIG. 9 shows an equivalent circuit of a display element with two TFTs, FIG. 10 shows a display device with a state memory, FIG. 11 shows an integrated sequence of preset pulses and drive signals, FIG. 12 shows a histogram of a display device with a state memory for two previous states, and FIG. 13 shows a histogram of a display device with a state memory for two previous states and a drive signal preceded by four preset pulses for each transition.

The Figures are schematic and not drawn to scale, and, in general, like reference numerals refer to like parts.

Figure 1:
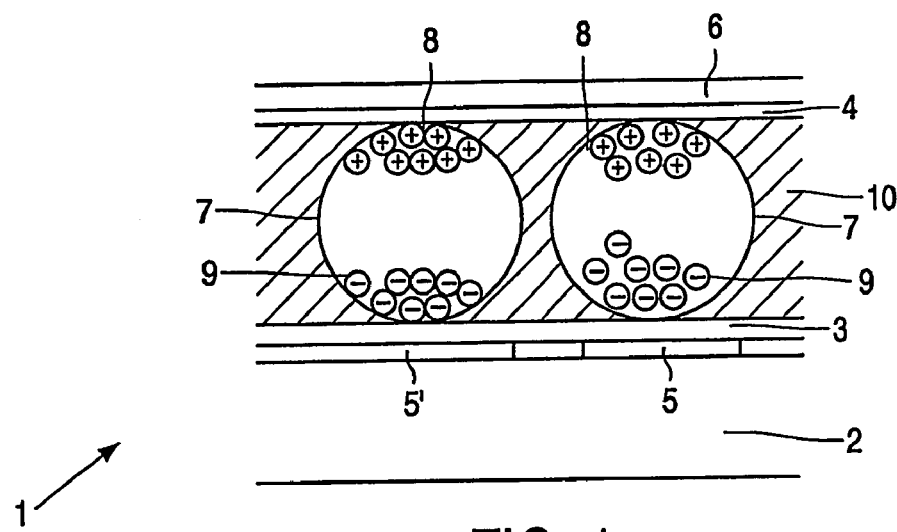
FIG. 1 is a diagrammatic cross-section of a portion of a display device.

FIG. 1 is a diagrammatic cross-section of a portion of an electrophoretic display device 1, for example of the size of a few display elements, comprising a base substrate 2, an electrophoretic film with an electronic ink which is present between two transparent substrates 3,4 of, for example, polyethylene. One of the substrates 3 is provided with transparent picture electrodes 5 and the other substrate 4 is provided with a transparent counter electrode 6. The electronic ink comprises multiple microcapsules 7 of about 10 to 50 microns. Each microcapsule 7 comprises positively charged white particles 8 and negatively charged black particles 9 suspended in a fluid 10. When a negative field is applied to the counter electrode 6, the white particles 8 move to the side of the microcapsule 7 directed to the counter electrode 6, and the display element becomes visible to a viewer. Simultaneously, the black particles 9 move to the opposite side of the microcapsule 7 where they are hidden from the viewer. By applying a positive field to the counter electrodes 6, the black particles 9 move to the side of the microcapsule 7 directed to the counter electrode 6, and the display element appears dark to a viewer (not shown). When the electric field is removed, the particles 7 remain in the acquired state and the display exhibits a bi-stable character and consumes substantially no power.

Figure 2:
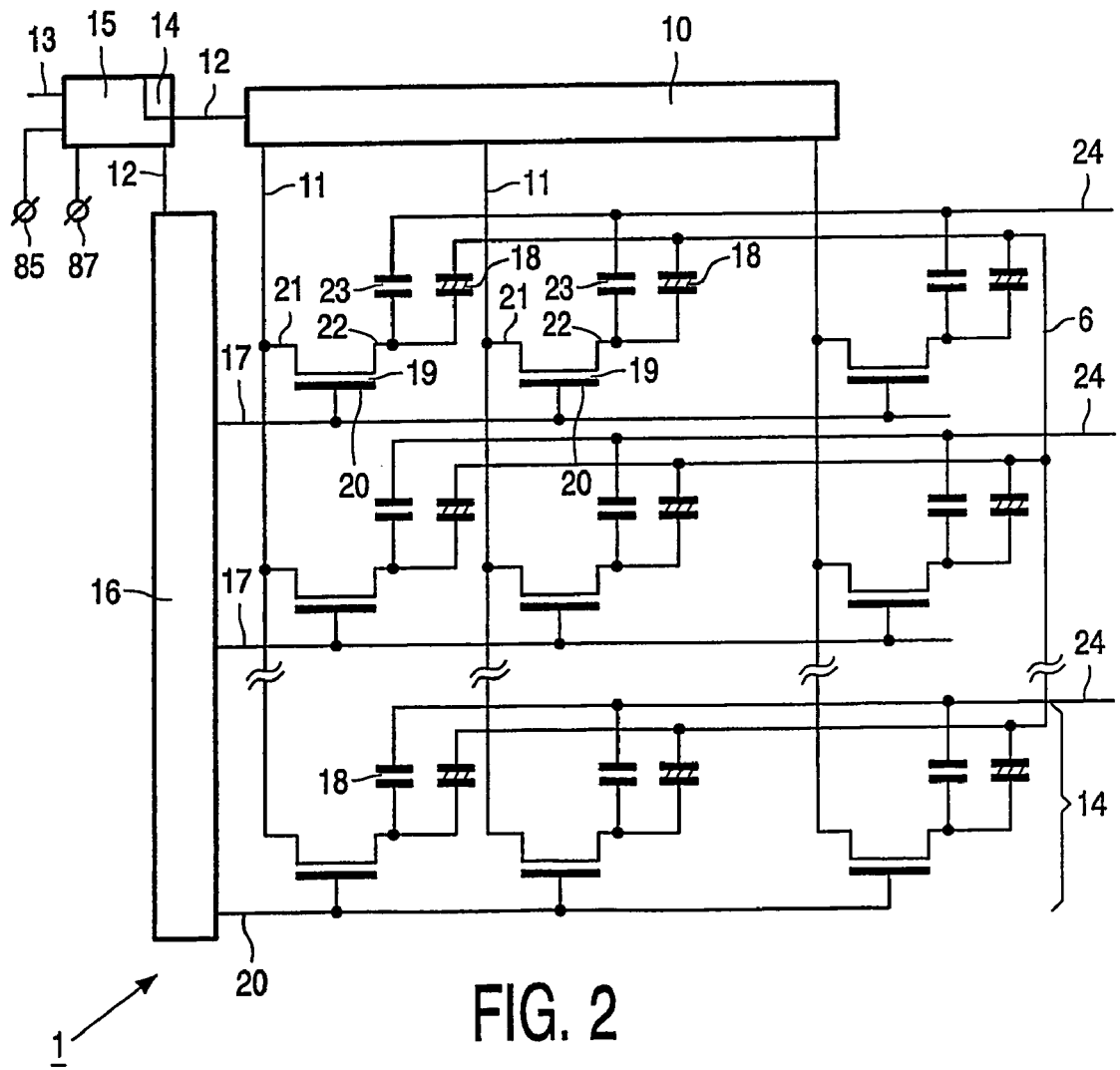
FIG. 2 is an equivalent circuit diagram of a portion of a display device.

FIG. 2 is an equivalent circuit diagram of a picture display device 1 comprising an electrophoretic film laminated on a base substrate 2 provided with active switching elements, a row driver 16 and a column driver 10. Preferably, a counter electrode 6 is provided on the film comprising the encapsulated electrophoretic ink, but could be alternatively provided on a base substrate in the case of operation with in-plane electric fields. The display device 1 is driven by active switching elements, in this example thin-film transistors 19. It comprises a matrix of display elements at the area of crossings of row or selection electrodes 17 and column or data electrodes 11. The row driver 16 consecutively selects the row electrodes 17, while a column driver 10 provides a data signal to the column electrode 11. Preferably, a processor 15 first processes incoming data 13 into the data signals. Mutual synchronisation between the column driver 10 and the row driver 16 takes place via drive lines 12. Select signals from the row driver 16 select the pixel electrodes 22 via the thin-film transistors 19 whose gate electrodes 20 are electrically connected to the row electrodes 17 and the source electrodes 21 are electrically connected to the column electrodes 17. A data signal present at the column electrode 17 is transferred to the pixel electrode 22 of the display element coupled to the drain electrode via the TFT. In the embodiment, the display device of FIG. 1 also comprises an additional capacitor 23 at the location of each display element 18. In this embodiment, the additional capacitor 23 is connected to one or more storage capacitor lines 24. Instead of TFTs, other switching elements can be used, such as diodes, MIMs, etc.

Figure 3:
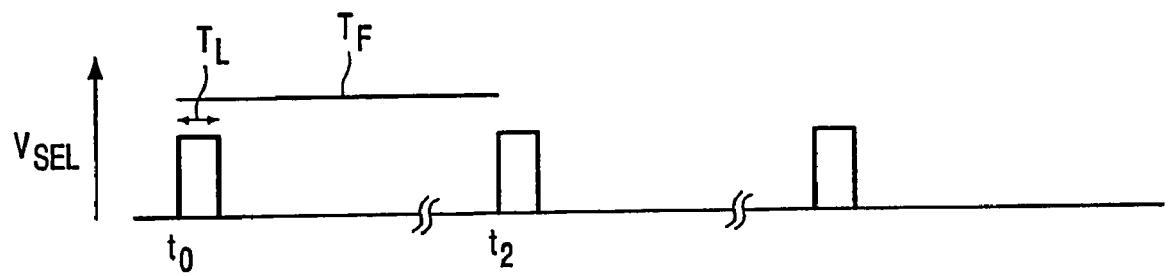
FIGS. 3 and 4 show drive signals and internal signals of the display device.
Figure 4:
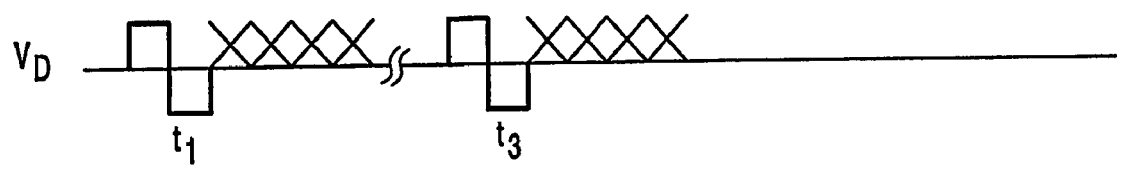

FIGS. 3 and 4 show drive signals of a conventional display device. At the instant t0, a row electrode 17 is energized by means of a selection signal Vsel (FIG. 1), while simultaneously data signals Vd are supplied to the column electrodes 11. After a line selection time tL has elapsed, a subsequent row electrode 17 is selected at the instant t1, etc. After some time, for example, a field time or frame time, usually 16.7 msec or 20 msec, said row electrode 17 is energized again at instant t2 by means of a selection signal Vsel, while simultaneously the data signals Vd are presented to the column electrode 11, in the case of an unchanged picture. After a selection time tL has elapsed, the next row electrode is selected at the instant t3. This is repeated from instant t4. Because of the bistable character of the display device, the electrophoretic particles remain in their selected state and the repetition of data signals can be halted after several frame times when the desired grey level is obtained. Usually, the image update time is several frames.

Figure 5:
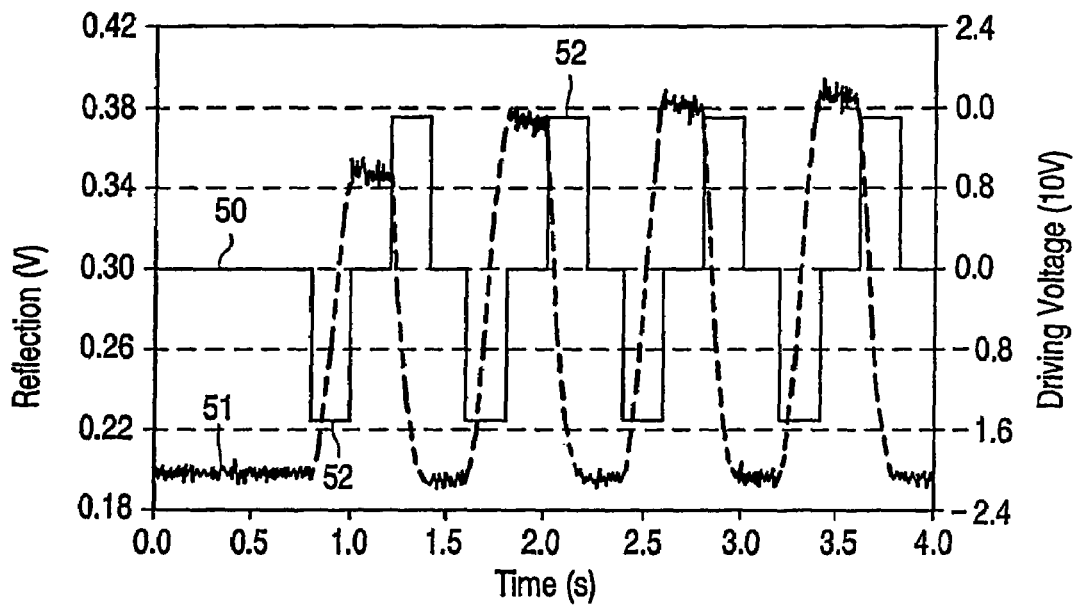
FIG. 5 shows an optical response of a data signal.

FIG. 5 shows a first signal 51 representing an optical response of a display element of the display device of FIG. 2 on a data signal 50 comprising pulses of alternating polarity after a dwell period of several seconds. In FIG. 5, the optical response 51 is indicated by ———— and the data signal by ————. Each pulse 52 of the data signal 50 has a duration of 200 ms and a voltage with an alternating polarity of plus and minus 15 V. FIG. 5 shows that the optical response 51 after the first negative pulse 52 is not a desired grey level which is obtained only after the third or fourth negative pulse.

In order to improve the accuracy of the desired grey level with the data signal, the processor 15 generates a single preset pulse or a series of preset pulses before the data pulses of a subsequent refresh field, where the pulse time is typically 5 to 10 times less than the interval between an image update and a subsequent image update. If the interval between two image updates is 200 ms, the duration of a preset pulse is typically 20 ms.

Figure 6:
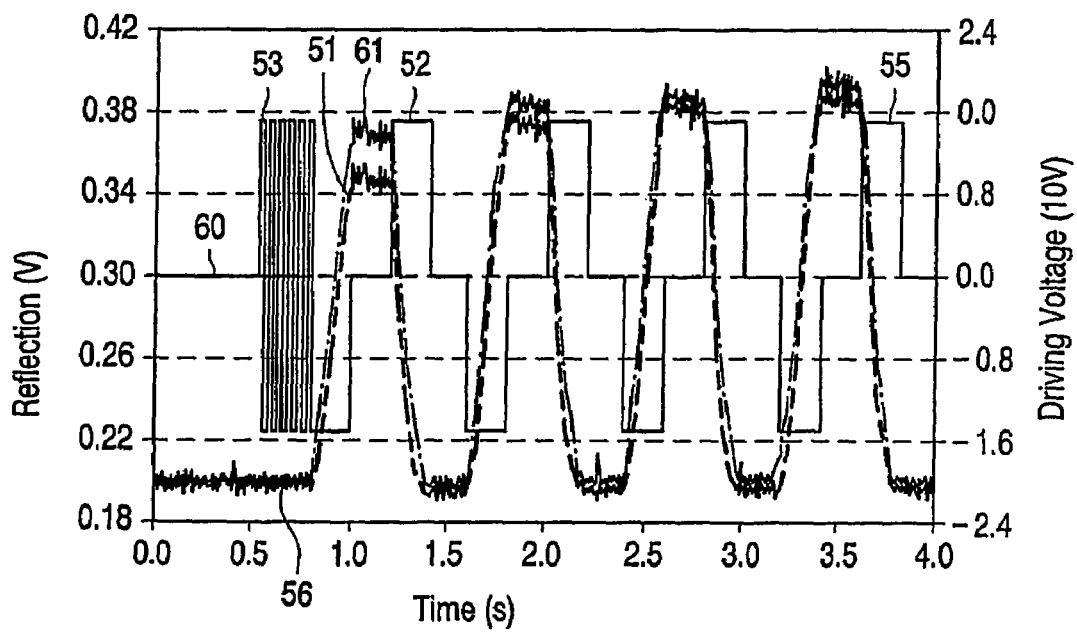
FIG. 6 shows an optical response of a preset signal and a data signal.

FIG. 6 shows the optical response of a data signal 60 of the display device of FIG. 2 as a response of a series of 12 preset pulses of 20 ms and data pulses of 200 ms having a voltage of alternating polarity of plus and minus 15 V. In FIG. 5, the optical response 51 is indicated by ————, the improved optical response 61 by ———— and the data signal by ————. The series of preset pulses consists of 12 pulses of alternating polarity. The voltage of each pulse is plus or minus 15 V. FIG. 6 shows a significant increase of the grey scale accuracy, the optical response 61 is substantially at the same level as the optical response after the fourth data pulse 55. However, some flicker introduced by the preset pulses may become visible, see optical response 56. In order to reduce the visibility of this flicker, the processor 15 and the row driver 16 can be arranged in such a way that the row electrodes 17 associated with display elements are interconnected in two groups, and the processor 15 and the column driver 10 are arranged to execute an inversion scheme by generating a first preset signal having a first phase to the first group of display elements and a second reset signal having a second phase to the second group of display elements, wherein the second phase is opposite to the first phase. Alternatively, multiple groups can be defined, for which reset pulses are supplied with different phases. For example, the row electrodes 17 can be interconnected in two groups, one group of the even rows and one group of the odd rows, with the processor generating a first preset signal consisting of six preset pulses with an alternating polarity of plus and minus 15 V, starting with a negative pulse to the display elements of the even rows, and a second preset signal consisting of six preset pulses of alternating polarity of plus and minus 15 V, starting with a positive pulse to display elements of the odd rows.

FIG. 7 shows two graphs which are indicative of an inversion scheme. A first graph 71 relates to a first preset signal consisting of 6 preset pulses of 20 ms supplied to a display element of an even row n, and a second graph 73 relates to a second preset signal consisting of 6 preset pulses of 20 ms supplied to a display element of an odd row n+1, wherein the phase of the second preset signal is opposite to the phase of the first preset signal. The voltage of the pulse alternates between plus and minus 15 V.

Instead of the series of preset pulses applied to two or more different groups of rows, the display elements can be divided into two groups of columns, for example, one group of even columns and one group of odd columns, wherein the processor 15 executes an inversion scheme by generating a first preset signal consisting of six preset pulses of alternating polarity of plus and minus 15 V, starting with a negative pulse to the display elements of the even columns, and a second preset signal consisting of six preset pulses of alternating polarity of plus and minus 15 V, starting with a positive pulse to the display elements of the odd columns. Here, all rows can be selected simultaneously. In further embodiments, inversion schemes as discussed above can be simultaneously supplied to both rows and columns to generate a so-called dot-inversion scheme, which still further reduces optical flicker.

In a further embodiment, the counter electrode 80 is shaped as two interdigitized comb structures 81,83 as shown in FIG. 8 in order to reduce optical flicker. This kind of electrode is well known to the skilled person. The two counter electrodes 81,83 are coupled to two outputs 85,87 of the processor 15. Furthermore, the processor 15 is arranged to generate an inversion scheme by supplying a first preset signal consisting of six preset pulses of 20 ms and an alternating polarity of plus and minus 15 V, starting with a negative pulse to the first comb structure 81, and a second preset signal consisting of six preset pulses of 20 ms and an alternating polarity of plus and minus 15 V, starting with a positive pulse to the second comb structure 83, whilst maintaining the pixel electrode 23 at 0 V. After the preset pulses are supplied, the two comb structures 81,83 can be connected to each other before new data is supplied to the display device.

In a further embodiment, the preset pulses can be applied by the processor 15 via the additional storage capacitors 23 by charge sharing between the additional storage capacitor 23 and the pixel capacitance 18. In this embodiment, the storage capacitors on a row of display elements are connected to each other via a storage capacitor line, and the row driver 16 is arranged to interconnect these storage capacitor lines to each other in two groups allowing inversion of the preset pulses across two groups, a first group related to even rows of display elements and a second group related to odd rows of display elements. In order to improve grey scale reproduction before new data is supplied to the display elements, the row driver executes an inversion scheme by generating a first preset signal consisting of 6 preset pulses of alternating polarity to the first group, and a second preset signal consisting of 6 preset pulses of alternating polarity to the second group, wherein the phase of the second signal is opposite to the phase of the first signal. After the preset pulses are supplied to the display elements, the storage capacitors can be grounded before the new data is supplied to the display elements.

In a further embodiment, the preset pulses can be applied directly to the pixel electrode 22 by the processor 15 via an additional thin-film transistor 90 coupled via its source 94 to a dedicated preset pulse line 95. The drain 92 is coupled to the pixel electrode 22. The gate 91 is coupled via a separate preset pulse addressing line 93 to the row driver 16. The addressing TFT 19 must be non-conducting by, for example, setting the row electrode 17 to 0 V.

When the preset signal is applied to all display elements simultaneously, flicker may occur. Therefore, preset signal inversion is applied by division of the additional thin-film transistors 90 into two groups, one group being connected to display elements of even rows and one group being connected to display elements of odd rows. Both groups of TFTs 90 are separately addressable and connected to the preset pulse lines 95. The processor 15 executes an inversion scheme by generating a first preset signal consisting of, for example, 6 preset pulses of 20 ms and a voltage 15 V of alternating polarity to the first group of TFTs 90 via the preset pulse line 95, and a second preset signal consisting of 6 preset pulses of 20 ms and a voltage of 15 V of alternating polarity to the second groups of TFTs 90, wherein the phase of the second signal is opposite to the phase of the first signal. Alternatively, a single set of TFTs addressable in the same period can be attached to two separate preset pulse lines with inverted pre set pulses.

After the preset signals are supplied to the TFTs 90, the TFTs are deactivated before new data is supplied via the column drivers 10.

Further power reductions are possible in the described embodiments by applying any of the well-known charge recycling techniques to the (inverted) preset pulse sequences to reduce the power used to charge and discharge pixel electrodes during the preset pulse cycles.

In order to improve the grey-scale reproduction of the displayed image information, a conventional electrophoretic display device can be provided with memory means for storing various previous states and the current state of the display elements.

FIG. 10 shows a conventional electrophoretic display device 100 for displaying image information provided to the display device in a series of consecutive frames N−1,N, N+1. The display device has a similar arrangement as the device as shown in FIG. 2, extended with memory means, for example, a first RAM memory 101 and a second RAM memory 103 for storing a previous state of the display elements corresponding to a frame N−1 directly before a current frame N is displayed, and a current state of the display elements corresponding to the current frame N which is being displayed, respectively. Furthermore, processing means 15 are arranged to generate the drive signal 12 in dependence upon the stored previous state of the previous frame N−1, the stored current state of the display element corresponding to the current frame N being displayed and the new state of the display element corresponding to the new frame N+1 to be displayed. Preferably, the processing means 15 comprises a look-up table 105 which has address entries corresponding to one previous state of the display element, the current state of the display element and the new state of the display element, each state corresponding to a 4-bit number corresponding to a 16-level grey scale. These bits together form a 12-bit entry in the look-up table 105. Furthermore, the display device 100 may be provided with a digital temperature sensor 107 for sensing an operating temperature of the device and for providing a temperature compensation in order to reduce the temperature dependency of the grey value reproduction of the display device. To this end, the temperature sensor 107 generates, for example, a 4-bit number representing an actual operating temperature of the display device, and the entry of the look-up table 105 is extended with these further 4 bits. Now, the look-up table entry consists of 16 bits. These entries of the look-up table 105 point to a predetermined drive parameter of the drive signal for transition of a display element from a first grey value corresponding to a current state corresponding to frame N to a second grey value in a new state corresponding to frame N+1. The look-up table 105 can be realized in a ROM memory. The drive signal may consist of a pulse of fixed duration and varying amplitude, a pulse with a fixed amplitude, alternating polarity and a varying duration between/two extreme values, and a hybrid drive signal wherein both the pulse length and the amplitude can be varied. For a pulse amplitude drive signal, this predetermined drive parameter indicates the amplitude of the drive signal including the sign thereof For a pulse time modulated drive signal, the predetermined drive parameter indicates the duration and sign of the pulse making up the drive signal. For a hybrid generation or pulse-shaped drive signal, the predetermined drive parameter indicates the amplitude and the length of portions making up the drive pulse. The predetermined drive parameter may be, for example, an 8-bit number. For each entry in the look-up table 105, the drive parameter is experimentally determined for a selected type of electronic ink for a corresponding grey level transition and different predetermined operating temperatures. The drive signal 12 is applied to the column driver 10.

Furthermore, the generation of the drive signal in this electrophoretic display device 100 can be combined with the preset pulses in order to further improve the reproduction of grey scales. To this end, the preset pulses are generated before the drive signal in accordance with the examples described above. For example, the preset pulses may consist of 4 pulses having a duration of 40 ms and an amplitude of 15 V and an alternating polarity.

FIG. 11 shows an integrated sequence of preset pulses 97 and 4 drive signals V(n), V(n+1),V(n+2), V(n+3).

A comparison of the grey value reproduction of a conventional electrophoretic display without preset pulses inserted before the drive signal and an electrophoretic display device with preset pulses inserted before each drive signal is given in FIG. 12 and FIG. 13.

FIG. 12 shows a first histogram 120 of the brightness of a number of display elements of an electrophoretic display device comprising memories for two previous states of the display table and a look-up table. The brightnesses are measured after a transition from one of the 4 predetermined states corresponding to frame N to another of the 4 predetermined states corresponding to frame N+1. The previous states stored in the memories are a first previous state corresponding to a frame N−1, and a present state corresponding to a frame N. The first histogram shows the number of display elements having a brightness in L* as the result of a sequence of 1000 random transitions between 4 predetermined reflectance values, i.e. corresponding to 4 grey values of the drive signal with a dwell time of 2 seconds between two consecutive transitions. The maximum value of the brightness L* that can be obtained is 70. The minimal value of the brightness L* is 25. The brightness L* is defined as 116. (reflectance/100)$^{1/3}$−16, where the reflectance is a number between 0 and 100, 0 indicates no reflectance and 100 indicates absolute reflection.

In this conventional electrophoretic display device, no preset pulses are generated before the drive signal for a transition from one of the 4 predetermined grey values to another one of the 4 predetermined grey values. As can be seen from FIG. 12, the grey scale reproduction is poor.

FIG. 13 shows a second histogram 130 of the brightness of a number of display elements of an electrophoretic display device comprising memories for two previous states and a look-up table wherein preset pulses are inserted before the drive signal for a transition from one of the 4 predetermined grey values to another one of the predetermined grey values.

The brightness is measured after a transition from one of the 4 predetermined states corresponding to frame N to another of the 4 predetermined states corresponding to frame N+1. The previous states stored in the memories are a first previous state corresponding to a frame N−1, and a current state corresponding to a frame N. The second histogram 130 shows the brightness in L* of a number of display elements as the result of a sequence of 1000 random transitions to 4 possible reflectance values, i.e. corresponding to 4 predetermined grey values of the drive signal with a dwell time of 2 seconds between two consecutive transitions. The preset pulse sequence consists of 4 pulses of a duration of 40 ms and an amplitude of 15 V and an alternating polarity. A part of this sequence is shown in FIG. 11.

FIG. 13 shows that, with the reduced width of the distributions corresponding to the 4 predetermined grey scales as compared with the width of the distributions of the histogram in FIG. 12, the grey scale reproduction has improved significantly, wherein the grey scale error is 1.5 L*.

It will be obvious that many variations are possible within the scope of the invention without departing from the scope of the appended claims.

What is claimed is:

1. A display device comprising electrophoretic particles, a display element comprising a pixel electrode and an associated counter electrode, between which a portion of the electrophoretic particles is present, and control means for supplying a drive signal to the electrodes to bring the display element to a predetermined optical state corresponding to the image information to be displayed, characterized in that control means are further arranged to supply a preset signal preceding the drive signal comprising a preset pulse representing an energy which is sufficient to release the electrophoretic particles at a first position near one of the two electrodes corresponding to a first optical state, but is too low to enable the particles to reach a second position near the other electrode corresponding to a second optical state.

2. A display device as claimed in claim 1, wherein the duration of the preset pulse is one order of magnitude less than a time interval between two subsequent image updates.

3. A display device as claimed in claim 1, wherein the control means are further arranged to generate the preset pulse with a negative or positive polarity, and the control means are further arranged to generate the drive signal comprising a pulse with a negative or positive polarity, wherein the polarity of the preset pulse is opposite to the polarity of the pulse of the data signal.

4. A display device as claimed in claim 3, wherein the control means are further arranged to generate an even number of preset pulses.

5. A display device as claimed in claim 1, wherein one of the electrodes comprises a data electrode and the other electrode comprises a selection electrode, and the control means further comprise first drive means for applying a selection signal to the selection electrodes and second drive means for applying a data signal to the data electrode.

6. A display device as claimed in claim 1, wherein the pixel electrode of the display element is coupled to a selection electrode or a data electrode via a switching element, and the control means further comprise first drive means for applying a selection signal to the selection electrodes and second drive means for applying a data signal to the data electrode.

7. A display device as claimed in claim 5, wherein selection electrodes associated with display elements are interconnected in two groups, and the control means are arranged to generate a first preset signal having a first phase to the first group and a second reset signal having a second phase opposite to the first phase to the second group.

8. A display device as claimed in claim 5, wherein the second drive means are arranged to generate the preset signal.

9. A display device as claimed in claim 5, wherein the pixel electrode is coupled to the control means for generating the reset signal via the counter electrode.

10. A display device as claimed in claim 9, wherein the counter electrode is divided into two portions, and wherein each portion is associated with a set of display elements connected via a selection electrode.

11. A display device as claimed in claim 6, wherein the pixel electrode is coupled via a first additional capacitive element to the control means for receiving the preset signal.

12. A display device as claimed in claim 6, wherein the pixel electrode is coupled to the control means via a further switching element.

13. A display device as claimed in claim 1, wherein the display comprises two substrates, one of which is transparent, and the electrophoretic particles are present between the two substrates.

14. A display device as claimed in claim 1, wherein the electrophoretic material is an encapsulated electrophoretic material.

15. A display device as claimed in claim 1, wherein the image information is received in consecutive frames N−1,N and the display device further comprises memory means for storing a previous display state of the display elements corresponding to a frame N−1 directly before a new frame N to be displayed, and the processing means are further arranged to generate the drive signal in dependence upon the stored previous states and the new state of the display element corresponding to the new frame to be displayed.

16. A display device as claimed in claim 1, wherein the image information is received in consecutive frames N−1,N, N+1 and the display device further comprises memory means for storing a previous display state of the display elements corresponding to a frame N−1 directly before a current frame N is displayed and the current display state of the frame N is displayed, and the processing means are further arranged to generate the drive signal in dependence upon the stored previous state, the current state and the new state of the display element corresponding to the new frame N+1 to be displayed.

17. A display device as claimed in claim 1, wherein the display device is provided with a temperature sensor for sensing an operating temperature of the display device and a temperature compensating circuit for generating a drive signal in dependence upon a desired grey value and operating temperature.

* * * * *